(12) United States Patent
Moroga et al.

(10) Patent No.: US 11,528,709 B2
(45) Date of Patent: Dec. 13, 2022

(54) USER TERMINAL AND RADIO COMMUNICATION METHOD

(71) Applicant: NTT DOCOMO, INC., Tokyo (JP)

(72) Inventors: Hideyuki Moroga, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/643,374

(22) PCT Filed: Aug. 29, 2017

(86) PCT No.: PCT/JP2017/031028
§ 371 (c)(1),
(2) Date: Feb. 28, 2020

(87) PCT Pub. No.: WO2019/043800
PCT Pub. Date: Mar. 7, 2019

(65) Prior Publication Data
US 2021/0068112 A1     Mar. 4, 2021

(51) Int. Cl.
*H04W 72/04* (2009.01)
*H04L 5/00* (2006.01)
*H04W 80/08* (2009.01)

(52) U.S. Cl.
CPC ....... *H04W 72/0493* (2013.01); *H04L 5/0055* (2013.01); *H04W 72/042* (2013.01); *H04W 72/0446* (2013.01); *H04W 72/0453* (2013.01); *H04W 80/08* (2013.01)

(58) Field of Classification Search
CPC .......... H04W 72/0055; H04W 72/042; H04W 72/0446; H04W 72/0453; H04W 72/0493; H04W 80/08
See application file for complete search history.

(56) References Cited

U.S. PATENT DOCUMENTS

| | | | |
|---|---|---|---|
| 9,167,451 B2 * | 10/2015 | Kim | H04L 5/0053 |
| 9,191,326 B2 * | 11/2015 | Han | H04W 72/0446 |
| 9,369,256 B2 * | 6/2016 | Seo | H04L 1/1861 |
| 9,420,593 B2 * | 8/2016 | Takeda | H04W 16/32 |

(Continued)

FOREIGN PATENT DOCUMENTS

| | | | | |
|---|---|---|---|---|
| CA | 2828947 A1 * | 9/2012 | ........... | H04L 1/1861 |
| CN | 103493416 A * | 1/2014 | ........... | H04L 1/1861 |

(Continued)

OTHER PUBLICATIONS

Office Action issued in Russian Application No. 2020111088/07; dated Sep. 8, 2020 (12 pages).

(Continued)

*Primary Examiner* — Eric Nowlin
(74) *Attorney, Agent, or Firm* — Osha Bergman Watanabe & Burton LLP

(57) ABSTRACT

A terminal is disclosed including a receiver that receives a signal of a downlink shared channel; and a transmitter that transmits Acknowledgement (ACK)/Negative Acknowledgement (NACK) information for the signal of the downlink shared channel using an uplink control channel in a time resource included in a plurality of time resource candidates. In other aspects, a radio communication method and a base station are also disclosed.

4 Claims, 10 Drawing Sheets

(56) References Cited

U.S. PATENT DOCUMENTS

| | | | | |
|---|---|---|---|---|
| 9,668,248 | B2* | 5/2017 | Seo | H04L 5/0055 |
| 10,069,616 | B2* | 9/2018 | Uchino | H04L 5/0092 |
| 10,517,078 | B2* | 12/2019 | Kim | H04L 5/00 |
| 11,088,800 | B2* | 8/2021 | Joseph | H04L 5/0053 |
| 2014/0071864 | A1* | 3/2014 | Seo | H04L 1/1861 |
| | | | | 370/294 |
| 2014/0185483 | A1* | 7/2014 | Kim | H04W 24/02 |
| | | | | 370/252 |
| 2015/0049699 | A1* | 2/2015 | Takeda | H04W 76/15 |
| | | | | 370/329 |
| 2015/0092624 | A1* | 4/2015 | Yao | H04L 5/1461 |
| | | | | 370/278 |
| 2015/0195822 | A1* | 7/2015 | Han | H04J 3/1694 |
| | | | | 370/329 |
| 2015/0215875 | A1* | 7/2015 | Nakashima | H04W 52/24 |
| | | | | 370/336 |
| 2015/0229454 | A1* | 8/2015 | Takeda | H04B 7/0452 |
| | | | | 370/329 |
| 2016/0270066 | A1* | 9/2016 | Seo | H04W 4/06 |
| 2017/0005777 | A1* | 1/2017 | Uchino | H04L 5/1438 |
| 2018/0145815 | A1* | 5/2018 | Takeda | H04W 72/04 |
| 2018/0323907 | A1* | 11/2018 | Takeda | H04L 5/001 |
| 2019/0074936 | A1 | 3/2019 | Lee et al. | |
| 2019/0081763 | A1* | 3/2019 | Akkarakaran | H04L 1/1812 |
| 2019/0159191 | A1* | 5/2019 | Kim | H04W 72/14 |
| 2019/0182012 | A1* | 6/2019 | Liu | H04L 1/1854 |
| 2019/0239216 | A1* | 8/2019 | Kundu | H04L 5/0053 |
| 2019/0261397 | A1* | 8/2019 | Takeda | H04L 5/0053 |
| 2019/0372727 | A1* | 12/2019 | Joseph | H04B 17/336 |
| 2020/0007296 | A1* | 1/2020 | Papasakellariou | H04L 5/001 |
| 2021/0068112 | A1* | 3/2021 | Moroga | H04L 5/0055 |
| 2021/0204328 | A1* | 7/2021 | Harada | H04W 72/12 |

FOREIGN PATENT DOCUMENTS

| | | | | |
|---|---|---|---|---|
| CN | 103493416 B | * | 4/2017 | H04L 1/1861 |
| EP | 2681865 B1 | * | 7/2018 | H04L 1/1861 |
| JP | 5937624 B2 | * | 6/2016 | H04L 1/1861 |
| JP | 2014511057 A | * | 6/2016 | |
| JP | 2016140115 A | * | 8/2016 | H04L 1/1861 |
| JP | 6262801 B2 | * | 1/2018 | H04L 1/1861 |
| KR | 20120100759 A | * | 11/2018 | |
| WO | 2010000743 A2 | | 1/2010 | |
| WO | WO-2012118356 A2 | * | 9/2012 | H04L 1/1861 |
| WO | 2017/034096 A1 | | 3/2017 | |

OTHER PUBLICATIONS

International Search Report issued in PCT/JP2017/031028 dated Nov. 7, 2017 (2 pages).
Written Opinion of the International Searching Authority issued in PCT/JP2017/031028 dated Nov. 7, 2017 (3 pages).
Guangdong OPPO Mobile Telecom; "Time-domain resource allocation for NR"; 3GPP TSG RAN WG1 Meeting #90, R1-1713263; Prague, Czech Republic; Aug. 21-25, 2017 (8 pages).
ETSI TS 136 300 V14.3.0; "Lte; Evolved Universal Terrestrial Radio Access (E-UTRA) and Evolved Universal Terrestrial Radio Access Network (E-UTRAN); Overall description; Stage 2 (3GPP TS 36.300 version 14.3.0 Release 14)"; Jul. 2017; (347 pages).
ETSI TS 136 211 V14.2.0; "LTE; Evolved Universal Terrestrial Radio Access (E-UTRA); Physical channels and modulation (3GPP TS 36.211 version 14.2.0 Release 14)"; Apr. 2017; (196 pages).
ETSI TS 136 213 V14.2.0; "LTE; Evolved Universal Terrestrial Radio Access (E-UTRA); Physical layer procedures (3GPP TS 36.213 version 14.2.0 Release 14)"; Apr. 2017; (456 pages).
3GPP TSG RAN WG1 Meeting #88; R1-1702483 "Discussion on NR-PUCCH resource allocation" LG Electronics Athens, Greece; Feb. 13-17, 2017 (6 pages).
3GPP TSG RAN WG1 Meeting #88; R1-1704043 "WF on PUCCH resource allocation" LG Electronics, NTT Docomo, ETRI, CATT; Athens, Greece; Feb. 13-17, 2017 (3 pages).
3GPP TSG RAN WG1 Meeting #90; R1-1713261 "Resource indication for UL control channel" Guangdong OPPO Mobile Telecom; Prague, Czech Republic; Aug. 21-25, 2017 (2 pages).
Extended European Search Report issued in European Application No. 17923338.2, dated Mar. 15, 2021 (7 pages).
Office Action issued in Indian Application No. 202037012294; dated May 10, 2021 (6 pages).
Office Action issued in Japanese Application No. 2019-538799; dated Sep. 14, 2021 (10 pages).
Office Action issued in Chilean Application No. 202000480; dated Aug. 19, 2021 (24 pages).
Office Action issued in Chinese Application No. 201780094400.5 dated Nov. 30, 2021 (12 pages).
Office Action issued in Korean Application No. 10-2020-7007459; dated Oct. 29, 2021 (8 pages).
Office Action issued in Japanese Application No. 2019-538799; dated Mar. 1, 2022 (8 pages).
Office Action issued in Korean Application No. 10-2020-7007459; dated Apr. 18, 2022 (6 pages).
Office Action issued in Korean Application No. 10-2020-7007459; dated Jun. 14, 2022 (6 pages).

* cited by examiner

USER TERMINAL AND RADIO COMMUNICATION METHOD

TECHNICAL FIELD

The present invention relates to a user terminal and a radio communication method.

BACKGROUND ART

Long Term Evolution (LTE) has been specified for achieving a higher data rate, lower latency, and/or the like in a Universal Mobile Telecommunication System (UMTS) network (NPL 1). Future systems of LTE have been also studied for achieving a broader bandwidth and a higher speed based on LTE. Examples of future systems of LTE include LTE-advanced (LTE-A), future radio access (FRA), 5th generation mobile communication system (5G), 5G plus (5G+), and new radio access technology (New-RAT).

According to the specification of LTE, orthogonal frequency division multiplexing (OFDM) is employed as a downlink communication method. In the case of OFDM, in a resource block consisting of 14 symbols, for each symbol, regions of a physical control channel (for example, physical downlink control channel (PDCCH)) including a control signal and a physical data channel (for example, physical downlink shared channel (PDSCH)) including a data signal are defined (NPLs 2 and 3).

A decrease in peak to average power ratio (PAPR) is required for next generation mobile communication systems. Therefore, it is possible that a single carrier transmission method with a small PAPR is used as a downlink communication method in 5G. With a single carrier transmission method, a signal is mapped in a time domain, so that the physical control channel and physical data channel are not necessarily defined for each symbol of OFDM and a flexible configuration can therefore be achieved. The single carrier transmission method enables flexible configuration of an uplink physical control channel (for example, a physical uplink control channel (PUCCH)) through which the user terminal feeds back the decoding result related to the data signal included in the downlink signal.

CITATION LIST

Non-Patent Literature

NPL 1
3GPP TS 36.300 v14.3.0, "Evolved Universal Terrestrial Radio Access (E-UTRA) and Evolved Universal Terrestrial Radio Access Network (E-UTRAN); Overall description; Stage 2 (Release 14)," June 2017

NPL 2
3GPP TS 36.211 v14.2.0, "Evolved Universal Terrestrial Radio Access (E-UTRA); Physical channels and modulation (Release 14)," March 2017

NPL3
3GPP TS 36.213 v14.2.0, "Evolved Universal Terrestrial Radio Access (E-UTRA); Physical layer procedures (Release 14)," March 2017

SUMMARY OF INVENTION

Technical Problem

However, no concrete method of configuring the uplink physical control channel has been studied.

An object of an aspect of the present invention is to provide a user terminal and a radio communication method in which an uplink physical control channel can be flexibly configured.

Solution to Problem

A user terminal according to an aspect of the present invention includes: a receiver that receives a downlink signal including a downlink control signal and a downlink data signal from a radio base station; a demodulator and decoder that demodulates and decodes the downlink data signal by using the downlink control signal; a mapper that maps a response signal indicating a decoding result related to the downlink data signal to, among multiple transmittable regions, a transmission region designated by index information contained in the downlink control signal; and a transmitter that transmits an uplink control signal containing the response signal.

Advantageous Effects of Invention

According to an aspect of the present invention, an uplink physical control channel can be flexibly configured.

DESCRIPTION OF EMBODIMENTS

An embodiment of the present invention will now be described in detail with reference to the accompanying drawings.

One Embodiment

Figure 1:
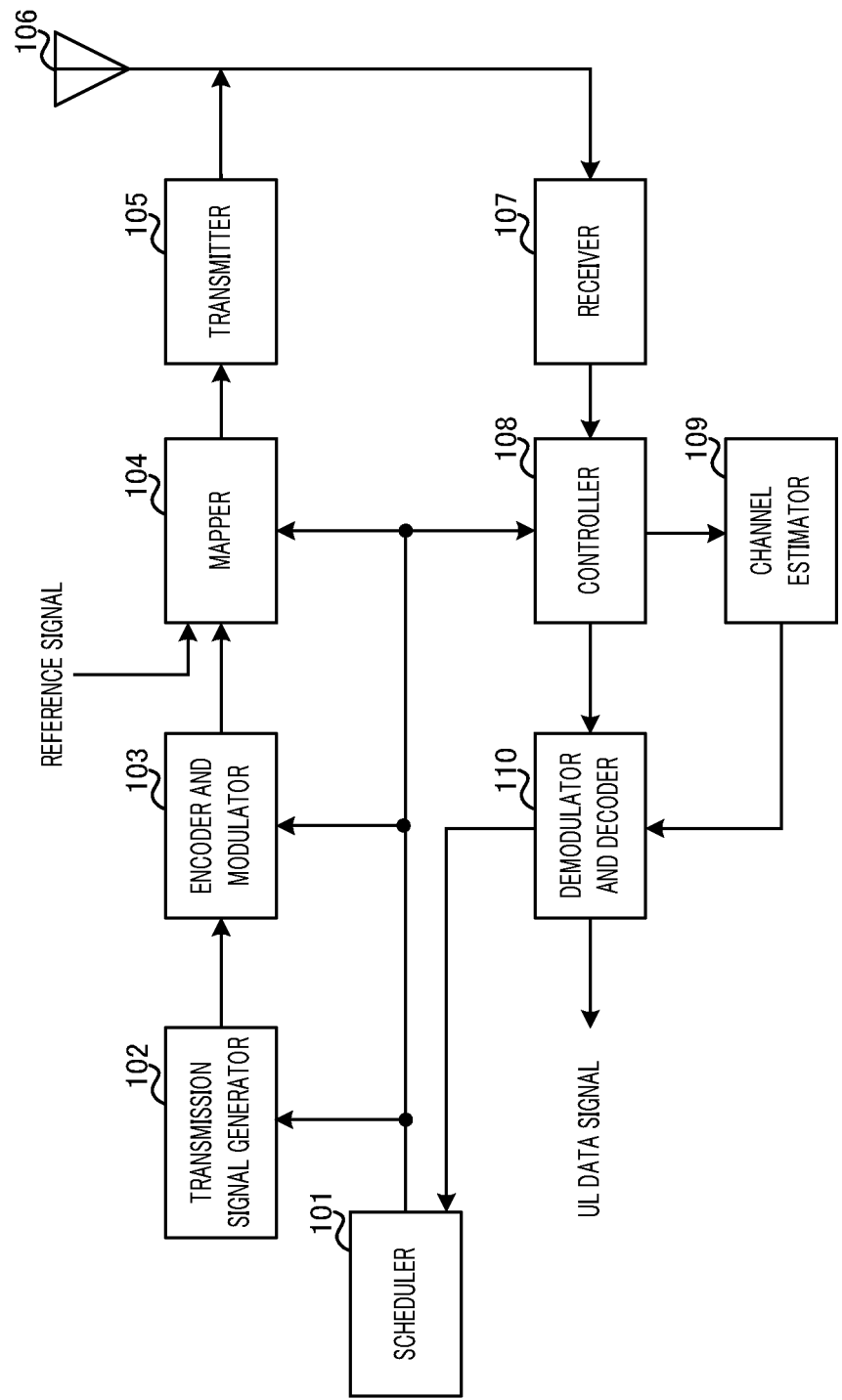
FIG. 1 is a block diagram showing an example of the overall configuration of a radio base station according to an embodiment of the present invention.
Figure 2:
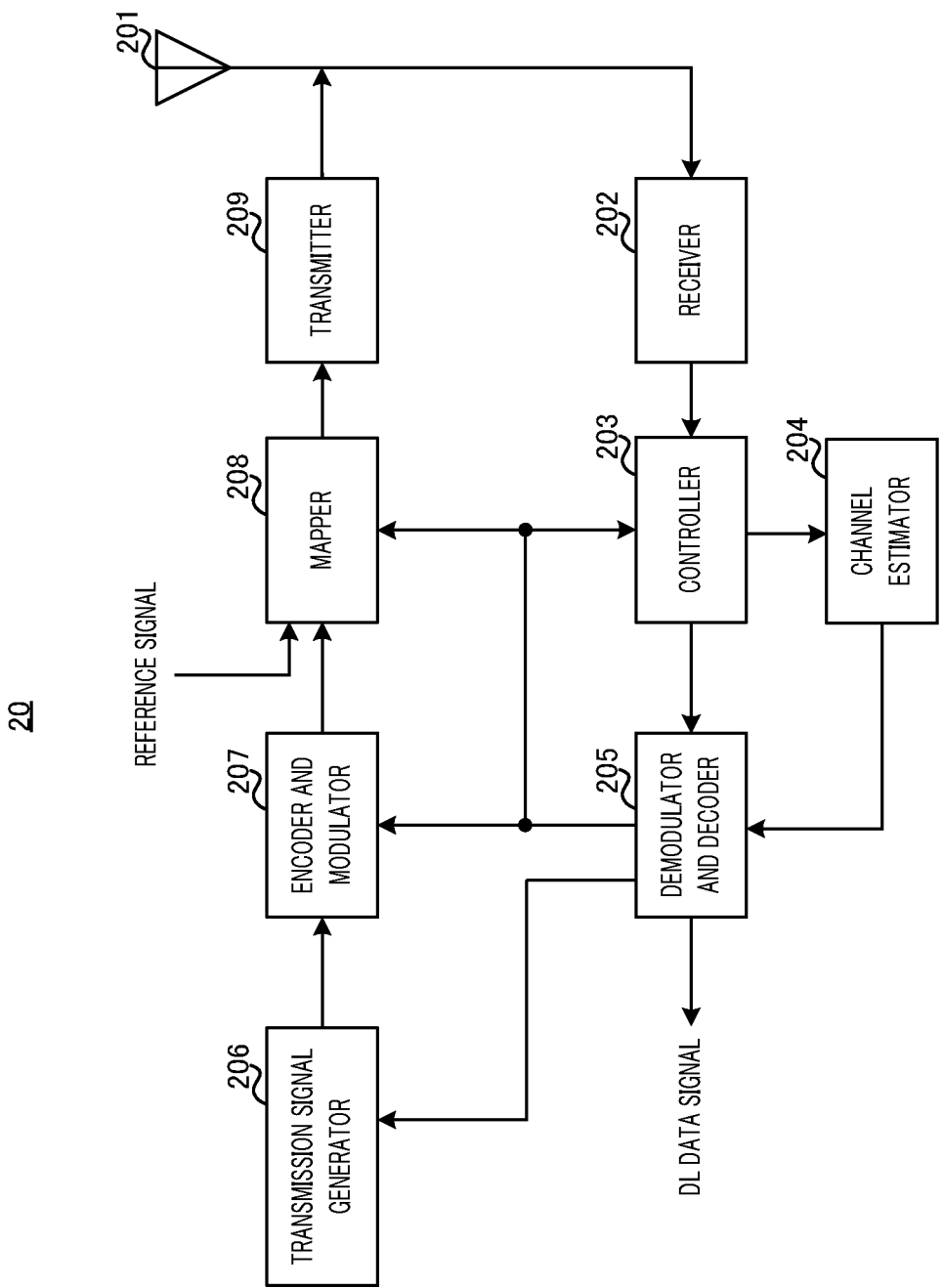
FIG. 2 is a block diagram showing an example of the overall configuration of a user terminal according to an embodiment of the present invention.

A radio communication system according to this embodiment includes at least radio base station 10 shown in FIG. 1 and user terminal 20 (also referred to as user equipment (UE), for example) shown in FIG. 2. User terminal 20 is connected to radio base station 10.

Radio base station 10 transmits, to user terminal 20, a DL control signal including downlink control information (for example, downlink control information (DCI)) through a downlink (DL) physical control channel (for example, a physical downlink control channel (PDCCH)), and a DL data signal and a demodulation reference signal (DMRS) for demodulation of the DL data signal through a DL physical data channel (for example, physical downlink shared channel (PDSCH)).

User terminal 20 transmits, to radio base station 10, a UL control signal including uplink control information (for example, uplink control information (UCI)) through a uplink (UL) physical control channel (for example, physical uplink control channel (PUCCH)) or UL physical data channel (for example, physical uplink shared channel (PUSCH)), and a UL data signal and DMRS through a UL physical data channel (for example, physical uplink shared channel (PUSCH)).

It should be noted that DL channels and UL channels through which radio base station 10 and user terminal 20 transmit and receive data are not limited to the aforementioned PDCCH, PDSCH, PUCCH, PUSCH, and/or the like, and may be, for example, a physical broadcast channel (PBCH), a random access channel (RACH), or other channels.

This embodiment describes an example in which a single carrier is used in a high frequency band (for example, 70 GHz band) for communication between radio base station 10 and user terminal 20. In the present invention, for example, DFT-S-OFDM (discrete Fourier transform (DFT)-spread-orthogonal frequency division multiplexing (OFDM)) may be used as a single carrier scheme. Alternatively, communication between radio base station 10 and user terminal 20 may be based on a multi-carrier scheme. In the present invention, any frequency band, for example, a frequency band of about several tens of gigahertz may be used without being limited to.

<Radio Base Station>

FIG. 1 is a block diagram showing an example of the overall configuration of radio base station 10 according to this embodiment. Radio base station 10 shown in FIG. 1 includes scheduler 101, transmission signal generator 102, encoder and modulator 103, mapper 104, transmitter 105, antenna 106, receiver 107, controller 108, channel estimator 109, and demodulator and decoder 110.

Scheduler 101 performs scheduling (for example, resource allocation) for a DL signal (for example, a DL data signal, a DL control signal, and a DMRS). Scheduler 101 also performs scheduling (for example, resource allocation) for an UL signal (for example, an UL data signal, an UL control signal, and a DMRS).

When the communication between radio base station 10 and user terminal 20 is performed using a single carrier, scheduler 101 performs scheduling for allocating a signal to a radio resource in time domain (time direction) of the single carrier.

In scheduling, scheduler 101 configures the transmission region of a DL physical control channel and the transmission region of a DL physical data channel. Scheduler 101 performs scheduling for the DL signal in each transmission region.

In addition, scheduler 101 configures at least the reception region of the UL physical control channel (the transmission region of the UL physical control channel related to user terminal 20).

It should be noted that scheduler 101 may configure the reception region of the UL physical data channel. In this case, scheduler 101 performs scheduling for the UL signal in each configured reception region.

Note that specific examples of the configurations of DL physical control channels and physical data channels, and UL physical control channels configured in scheduler 101 will be described later.

Scheduler 101 outputs scheduling information including information on resource allocation to transmission signal generator 102 and mapper 104.

In addition, scheduler 101 performs retransmission control of a DL data signal based on a signal indicating the decoding result related to the DL data signal input from demodulator and decoder 110 which will be described later. For example, if there is an error in the decoding result related to the DL data signal, scheduler 101 instructs transmission signal generator 102 to retransmit the DL data signal which has had the error. In contrast, when there is no error in the decoding result related to the DL data signal, scheduler 101 instructs transmission signal generator 102 to transmit the next DL data signal.

Further, scheduler 101 configures a modulation and coding scheme (MCS) (coding rate, modulation scheme, and/or the like) for the DL data signal and UL data signal according to, for example, the quality of the channel between radio base station 10 and user terminal 20, and outputs the MCS information to transmission signal generator 102 and encoder and modulator 103. Note that the MCS should not necessarily be configured by radio base station 10, and may be configured by user terminal 20. When user terminal 20 configures the MCS, radio base station 10 may receive the MCS information from user terminal 20 (not shown in the drawing).

Transmission signal generator 102 generates a DL signal including a DL data signal and a DL control signal. For example, the DL control signal includes downlink control information (DCI) including scheduling information (for example, resource allocation information on the DL data signal) or MCS information output from scheduler 101.

In addition, transmission signal generator 102 generates a DL signal for retransmission of a DL data signal or transmission of the next DL data signal, according to an instruction from scheduler 101.

Transmission signal generator 102 outputs the generated transmission signal to encoder and modulator 103.

Encoder and modulator 103 performs encoding processing and modulation processing on the transmission signal input from transmission signal generator 102, for example, according to the MCS information input from scheduler 101. Encoder and modulator 103 outputs the modulated transmission signal to mapper 104.

Mapper 104 maps a transmission signal input from encoder and modulator 103 to a predetermined radio resource according to the scheduling information (for example, DL resource allocation) input from scheduler 101. Further, mapper 104 maps a reference signal (for example, DMRS) to a predetermined radio resource according to the scheduling information. Mapper 104 outputs the DL signal mapped to the radio resource to transmitter 105.

Transmitter 105 performs transmission processing, such as up-conversion or amplification, on the DL signal input from mapper 104, and transmits a radio frequency signal (DL signal) from antenna 106.

Receiver 107 performs reception processing, such as amplification or down-conversion, on the radio frequency signal (UL signal) received at antenna 106, and outputs the UL signal to controller 108.

Controller 108 separates (demaps) the UL control signal, the UL data signal, and the DMRS from the UL signal input from receiver 107, according to the scheduling information (UL resource allocation) input from scheduler 101. Controller 108 then outputs the UL control signal and the UL data signal to demodulator and decoder 110, and outputs the DMRS to channel estimator 109.

Channel estimator 109 performs channel estimation using the DMRS related to the UL signal, and outputs the channel estimation value, which is the estimation result, to demodulator and decoder 110.

Demodulator and decoder 110 performs demodulation and decoding processing on the UL control signal input from controller 108. The UL control signal includes a response signal indicating the decoding result related to the DL data signal decoded in user terminal 20. For example, when there is an error in the decoding result related to the DL data signal, the signal indicating the decoding result related to the DL data signal is negative acknowledgement (NACK) (or negative acknowledge). When there is no error in the decoding result related to the DL data signal, the signal indicating the decoding result related to the DL data signal is acknowledgement (ACK) (or positive acknowledge). Demodulator and decoder 110 outputs a response signal (for example, ACK or NACK) indicating the decoding result related to the DL data to scheduler 101. ACK or NACK will hereinafter be referred to as ACK/NACK as appropriate.

Demodulator and decoder 110 performs demodulation and decoding processing on the UL data signal input from controller 108 according to the channel estimation value input from channel estimator 109. Demodulator and decoder 110 transfers the demodulated UL data signal to an application section (not shown in the drawing). It should be noted that the application section performs, for example, processing on the physical layer or layers higher than the MAC layer.

<User Terminal>

FIG. 2 is a block diagram showing an example of the overall configuration of user terminal 20 according to this embodiment. User terminal 20 shown in FIG. 2 includes antenna 201, receiver 202, controller 203, channel estimator 204, demodulator and decoder 205, transmission signal generator 206, encoder and modulator 207, mapper 208, and transmitter 209.

Receiver 202 performs reception processing, such as amplification or down-conversion, on the radio frequency signal (DL signal) received at antenna 201, and outputs the DL signal to controller 203. The DL signal includes at least a DL data signal, a DL control signal, and a DMRS.

Controller 203 separates (demaps) the DL control signal and the DMRS from the DL signal input from receiver 202. Controller 203 then outputs the DL control signal to demodulator and decoder 205, and outputs the DMRS to channel estimator 204.

Controller 203 also separates (demaps) the DL data signal from the DL signal according to the scheduling information (for example, DL resource allocation information) input from demodulator and decoder 205, and outputs the DL data signal to demodulator and decoder 205.

Channel estimator 204 performs channel estimation using the separated DMRS, and outputs the channel estimation value, which is the estimation result, to demodulator and decoder 205.

Demodulator and decoder 205 demodulates the DL control signal input from controller 203. In addition, demodulator and decoder 205 performs decoding processing (for example, blind detection processing) on the demodulated DL control signal. Demodulator and decoder 205 outputs the scheduling information (DL/UL resource allocation) addressed to the user terminal and obtained by decoding the DL control signal to controller 203 and mapper 208, and outputs the MCS information related to the UL data signal to encoder and modulator 207.

Demodulator and decoder 205 performs demodulation and decoding processing on the DL data signal input from controller 203 by using the channel estimation value input from channel estimator 204 according to the MCS information related to the DL data signal included in the DL control signal input from controller 203. In addition, demodulator and decoder 205 transfers the decoded DL data signal to the application section (not shown in the drawing). It should be noted that the application section performs, for example, processing on the physical layer or layers higher than the MAC layer.

In addition, demodulator and decoder 205 performs error detection on the decoded DL data signal and determines whether there is an error in the decoded DL data signal. Demodulator and decoder 205 outputs the determination result to transmission signal generator 206.

Transmission signal generator 206 generates a transmission signal (including a UL data signal or a UL control signal), and outputs the generated transmission signal to encoder and modulator 207.

For example, transmission signal generator 206 generates NACK when receiving, from demodulator and decoder 205, the determination result showing that there is an error in the decoding result related to the DL data signal, and generates ACK when receiving, from demodulator and decoder 205, the determination result showing that there is no error in the decoding result related to the DL data signal.

Encoder and modulator 207 performs encoding processing and modulation processing on the transmission signal input from transmission signal generator 206, for example, according to the MCS information input from demodulator and decoder 205. Encoder and modulator 207 outputs the modulated transmission signal to mapper 208.

Mapper 208 maps a transmission signal input from encoder and modulator 207 to a predetermined radio resource according to the scheduling information (for example, UL resource allocation) input from demodulator and decoder 205. Further, mapper 208 maps a reference signal (for example, DMRS) to a predetermined radio resource according to the scheduling information.

Mapper 208 outputs the UL signal mapped to the radio resource to transmitter 209.

Transmitter 209 performs transmission processing, such as up-conversion or amplification, on the UL signal (including at least the UL control signal) input from mapper 208, and transmits a radio frequency signal (UL signal) from antenna 201.

<Example Configuration of Transmission Signal>

A description will now be given of an example configuration of a transmission signal related to radio base station 10 and user terminal 20 in this embodiment.

Note that, in the following description, the DL physical control channel is referred to as PDCCH, the DL physical data channel as PDSCH, and the UL physical control channel as PUCCH.

In addition, in the following description, transmitting/receiving a signal included in PDCCH is expressed as transmitting/receiving PDCCH, as appropriate. Similarly, transmitting/receiving a signal included in PDSCH is expressed as transmitting/receiving PDSCH, as appropriate. Similarly, transmitting/receiving a signal included in PUCCH is expressed as transmitting/receiving PUCCH, as appropriate.

Figure 3:
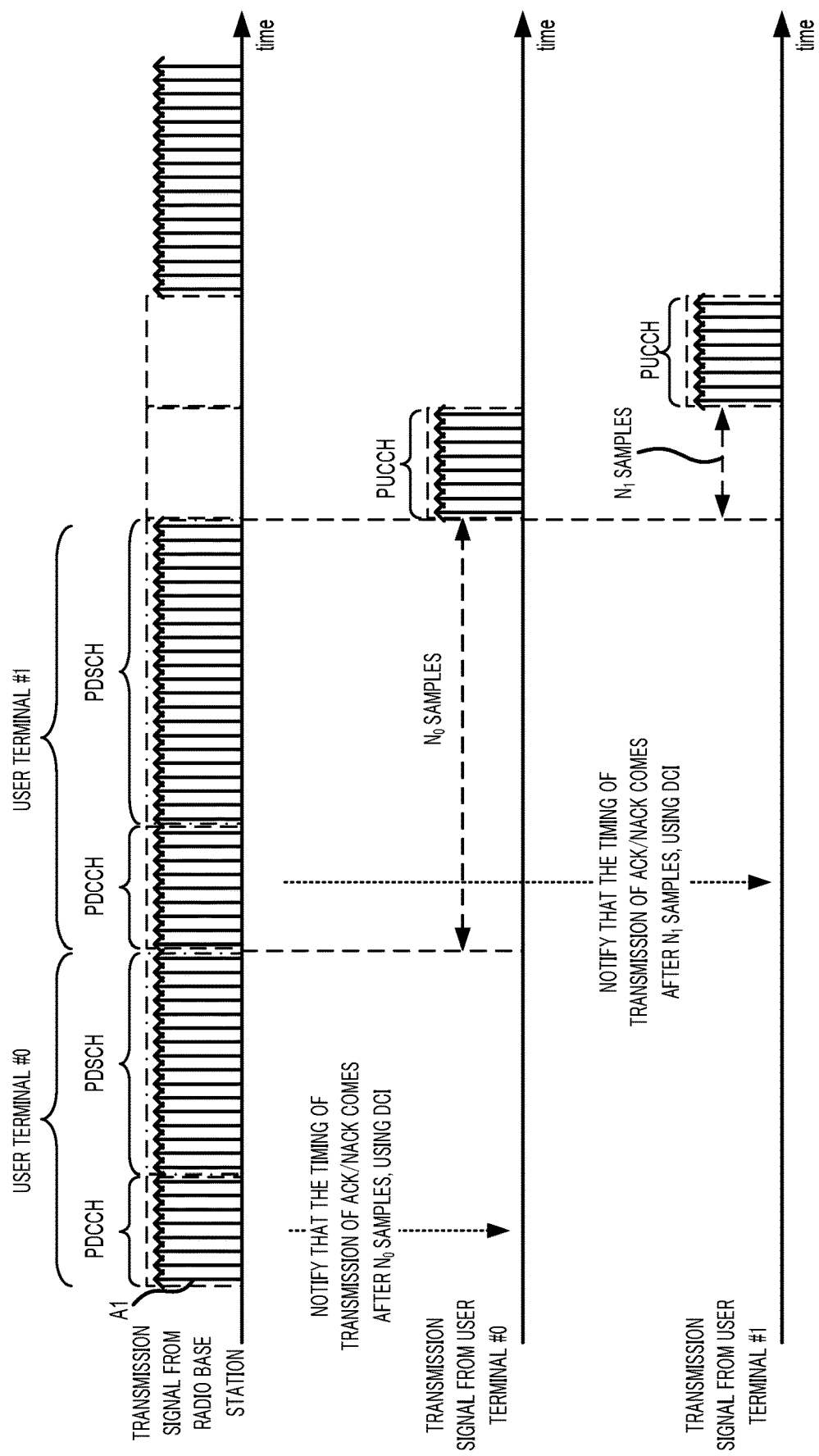
FIG. 3 is a diagram showing an example of a transmission signal from a radio base station and a transmission signal from a user terminal.

FIG. 3 is a diagram showing an example of a transmission signal from radio base station 10 and a transmission signal from user terminal 20. The horizontal axis of FIG. 3 indicates the time axis. Note that, in FIG. 3, in order to distinguish two user terminals 20, they are represented by user terminal #0 and user terminal #1, respectively.

Arrows A1 in the transmission signal shown in FIG. 3 indicate transmission points from which a DL signal and a UL signal are transmitted through a single carrier. In the following description, a transmission point indicated by arrow A1 is referred to as a sample point in some cases. The interval between sample points is, for example, "1/system bandwidth". It should be noted that the transmission point indicated by arrow A1 may be referred to as subcarrier, tone, resource element, resource group, component, symbol, mini symbol, slot, mini slot, or sample. In other words, the name of the transmission point indicated by arrow A1 is not limited to sample point or is not limited to the names listed above.

In the configuration shown in FIG. 3, radio base station 10 transmits the PDCCH and the PDSCH of user terminal #0 and user terminal #1, respectively. With a single carrier, processing, such as fast Fourier transform (FFT), is not required for a specific section (for example, a section of one OFDM symbol) unlike the OFDM method; therefore, in a time domain, signals (channels) are configured for each sample. For this reason, the length and/or arrangement and/or the like of the PDCCH and/or PDSCH and/or the like can be flexibly configured. Such a flexible configuration with a single carrier is referred to as "flexible single carrier configuration" as appropriate.

In the flexible single carrier configuration, transmission signals related to radio base station 10 are flexibly configured, and transmission signals related to user terminal 20 is also flexibly configured. In the flexible single carrier configuration, for example, whether or not a PUCCH is allocated to each sample can be configured, making the configuration of PUCCHs flexible. A PUCCH includes, for example, a response signal (for example, ACK/NACK) indicating the result of decoding of the data signal included in the PDSCH by user terminal 20.

Since PUCCHs are flexibly configured, radio base station 10 notifies each user terminal 20 of the ACK/NACK transmission timing (transmission region of the PUCCH) through the DCI included in the PDCCH.

In FIG. 3, radio base station 10 notifies user terminal #0 that the ACK/NACK transmission timing comes after No samples (No is an integer of one or more), through the DCI included in the PDCCH. User terminal #0 receives the PDCCH including the DCI and acquires the ACK/NACK transmission timing. User terminal #0 also receives the PDSCH and demodulates and decodes the data signal included in the PDSCH. User terminal #0 then transmits the PUCCH including the ACK/NACK after No samples have passed since the timing of completion of reception of the PDSCH.

Similarly, in FIG. 3, radio base station 10 notifies user terminal #1 that the ACK/NACK transmission timing comes after $N_1$ samples ($N_1$ is an integer of one or more), through the DCI included in the PDCCH. User terminal #1 receives the PDCCH including the DCI and acquires the ACK/NACK transmission timing. User terminal #1 also receives the PDSCH and demodulates and decodes the data signal included in the PDSCH. User terminal #1 then transmits the PUCCH including the ACK/NACK after $N_1$ samples have passed since the timing of completion of reception of the PDSCH.

In FIG. 3, radio base station 10 notifies the number of samples as the ACK/NACK transmission timing. In the case where the number of samples is notified, the number of bits of information used for notification inevitably increases.

In this embodiment, a method will be explained in which an increase in the number of bits of information for notifying the ACK/NACK transmission timing is suppressed and the uplink physical control channel (for example, PUCCH) which is the ACK/NACK transmission region can be flexibly configured.

<First Configuration Example>

Figure 4:
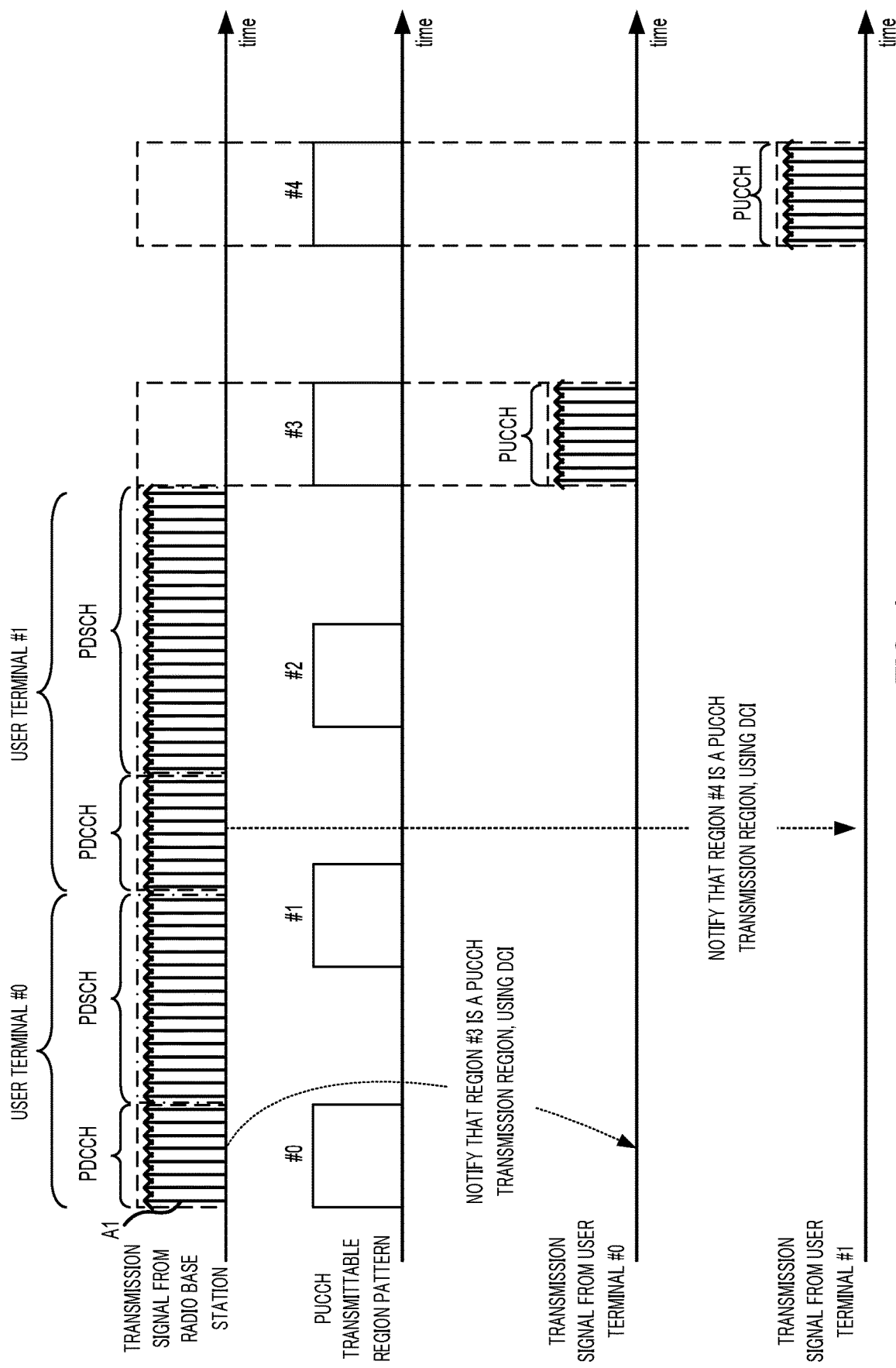
FIG. 4 is a diagram showing an example of a transmission signal from a radio base station and a transmission signal from a user terminal, according to the first configuration example of an embodiment of the present invention.

FIG. 4 is a diagram showing an example of a transmission signal from radio base station 10 and a transmission signal from user terminal 20, according to the first configuration example of this embodiment. The horizontal axis of FIG. 4 indicates the time axis. In FIG. 4, in order to distinguish two user terminals 20, they are represented by user terminal #0 and user terminal #1, respectively. As in FIG. 3, arrows A1 in the transmission signal shown in FIG. 4 indicate transmission points from which a DL signal and a UL signal are transmitted through a single carrier.

In addition, FIG. 4 shows regions where multiple PUCCHs are transmittable. In the following description, an arrangement pattern indicating the arrangement of multiple PUCCH transmittable regions (regions #0 to #4 in FIG. 4) in the resources of the time domain (and frequency domain) is referred to as a transmittable region pattern. A transmittable region indicates the position and length of a time domain in which a PUCCH can be transmitted. The transmittable region pattern is recognized in radio base station 10 and user terminal 20. Moreover, in the first configuration example, the transmittable region pattern is common to multiple user terminals 20. To be specific, in the first configuration example, multiple transmittable regions are arranged according to a common arrangement pattern for multiple user terminals 20.

The transmittable region pattern may be determined according to the specifications or may be notified through a higher layer signal and/or broadcast information (for example, master information block (MIB) and/or system information block (SIB)). Alternatively, the transmittable region pattern may be notified through a common PDCCH for the user terminals 20.

Scheduler 101 of radio base station 10 configures the arrangement and lengths of PDCCHs and PDSCHs for user terminal #0 and user terminal #1, for example, according to the requirements of the radio communication system (for example, the communication speed of the system, the communication capacity, the delay time, and the number of user terminals 20 connected to radio base station 10).

Scheduler 101 configures the arrangement and lengths of PDCCHs and PDSCHs for user terminal #0 and user terminal #1, for example, according to the amount of data addressed to user terminal 20 (for example, the size of the DL control signal and/or DL data signal).

Scheduler 101 then performs scheduling for the DL signal in the configured PDCCH and PDSCH. Information (hereinafter referred to as configuration information) indicating the lengths and arrangement of the PDCCH and PDSCH is notified from radio base station 10 to user terminal 20.

In addition, scheduler 101 configures transmission regions of the PUCCH transmitted by user terminal #0 and the PUCCH transmitted by user terminal #1, based on the PUCCH transmittable region pattern.

For example, scheduler 101 specifies, among multiple transmittable regions included in the PUCCH transmittable region pattern, transmittable regions included in regions in which no DL signals are transmitted and regions in which no other UL signals are received. Scheduler 101 then configures, among the specified transmittable regions, the transmittable region provided after the transmission signal addressed to each user terminal 20, as a PUCCH transmission region for that user terminal 20.

In the example shown in FIG. 4, among the transmittable regions, region #3 and region #4 are transmittable regions included in the regions in which no DL signals are transmitted. Region #3 and region #4 are both provided after the transmission signals addressed to user terminals 20 (user terminal #0 and user terminal #1). Scheduler 101 configures region #3 as the PUCCH transmission region for user terminal #0 and configures region #4 as the PUCCH transmission region for user terminal #1.

It should be noted that scheduler 101 may configure region #4 as the PUCCH transmission region for user terminal #0 and region #3 as the PUCCH transmission region for user terminal #1.

Scheduler 101 notifies the index information indicating the PUCCH transmission region through the DCI included in the PDCCH addressed to each user terminal 20. For example, scheduler 101 notifies the index information indicating region #3 configured as the PUCCH transmission region through the DCI included in the PDCCH addressed to user terminal #0, and notifies the index information indicating region #4 configured as the PUCCH transmission region through the DCI included in the PDCCH addressed to user terminal #1.

Upon reception of the DL signal transmitted from radio base station 10, user terminal 20 performs demodulation processing and decoding processing. At this time, demodulator and decoder 205 of user terminal 20 specifies the arrangement and length of a PDCCH for the DL signal according to the configuration information and performs demodulation processing and decoding processing on the DL control signal mapped to the specified PDCCH. Demodulator and decoder 205 then performs demodulation processing and decoding processing on the DL data signal mapped to the PDSCH by using the DL control signal.

Demodulator and decoder 205 outputs the index information included in the DCI of the DL control signal to mapper 208. In addition, demodulator and decoder 205 performs decoding processing on the DL data signal and determines whether there is an error in the DL data signal. Demodulator and decoder 205 outputs the determination result to transmission signal generator 206.

Transmission signal generator 206 generates NACK when receiving the determination result showing that there is an error in the DL data signal, and generates ACK when receiving the determination result showing that there is no error in the DL data signal. Transmission signal generator 206 outputs ACK/NACK to encoder and modulator 207.

Encoder and modulator 207 performs encoding processing and modulation processing on the ACK/NACK. Encoder and modulator 207 outputs the ACK/NACK that has been subjected to encoding processing and modulation processing to mapper 208.

Mapper 208 configures the PUCCH transmission region according to the index information acquired from demodulator and decoder 205 and the recognized transmittable region pattern, and maps the ACK/NACK in the configured PUCCH transmission region. In other words, mapper 208 maps ACK/NACK to the transmission region specified among the multiple transmittable regions by the index information.

It should be noted that the transmittable region pattern is not limited to that shown in FIG. 4. Variations of transmittable region pattern will be described below.

Figure 5:
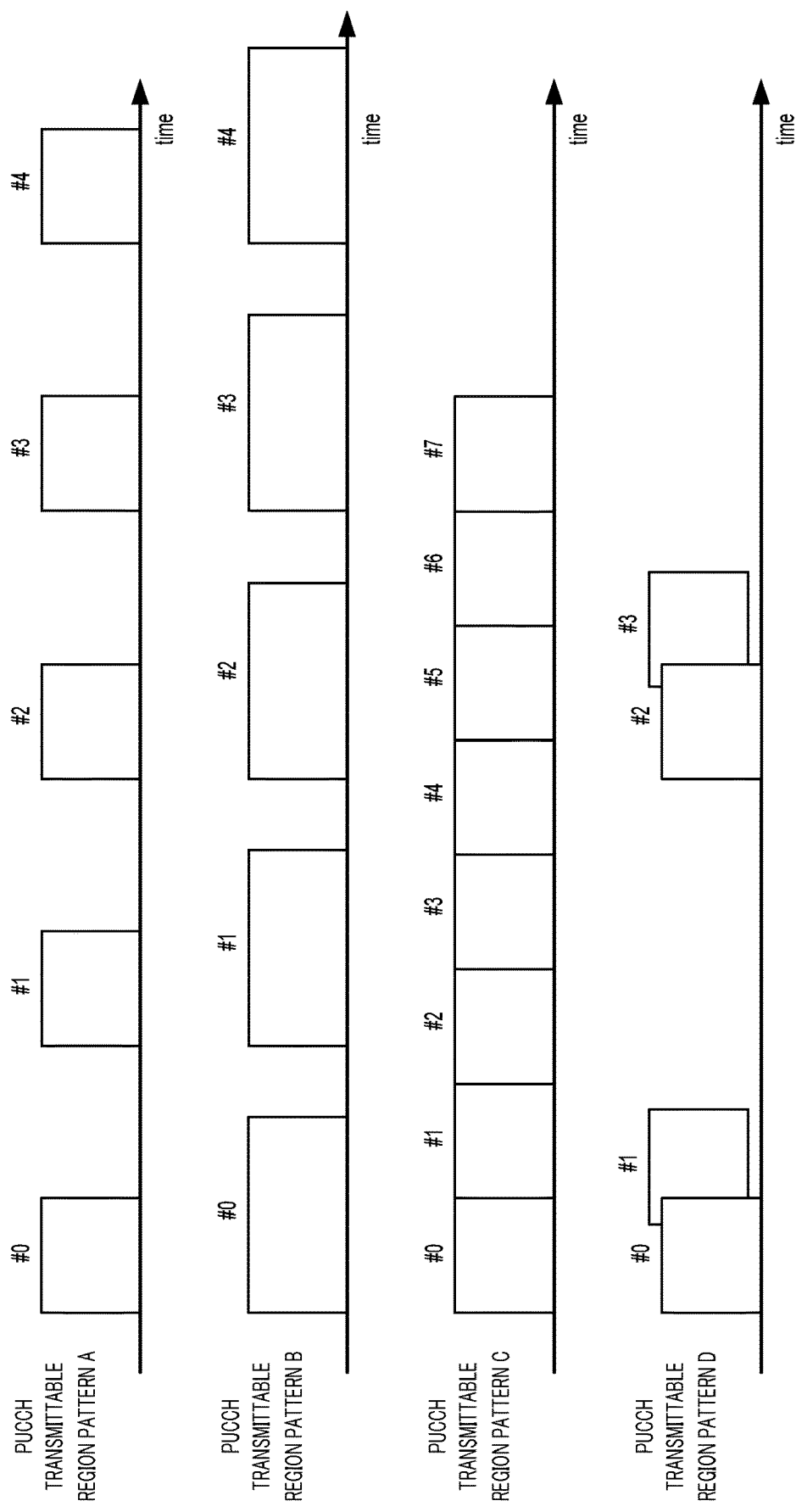
FIG. 5 is a diagram showing the first example of a transmittable region pattern according to the first configuration example of an embodiment of the present invention.

FIG. 5 is a diagram showing the first example of a transmittable region pattern according to the first configuration example of this embodiment. The horizontal axis of FIG. 5 indicates the time axis. FIG. 5 shows four transmittable region patterns which are transmittable region patterns A to D. It should be noted that transmittable region pattern A corresponds to the transmittable region pattern shown in FIG. 4.

As shown in transmittable region pattern A and transmittable region pattern B, the length of the time domain of one transmittable region may be changed.

Further, as shown in transmittable region pattern C, transmittable regions may be configured to be continuous in the time domain.

Further, as shown in transmittable region pattern D, transmittable regions may be configured to overlap each other in the time domain.

When multiple user terminals 20 transmit PUCCHs in the same frequency band, region #0 and region #1 in transmittable region pattern D are not configured as PUCCH transmission regions of different user terminals 20.

Note that the transmittable region patterns shown in FIG. 5 are patterns that define transmittable regions in one frequency band. Next, a description will be given of variations of transmittable region pattern for switching the band for transmitting a PUCCH between multiple frequency bands (performing frequency hopping).

Figure 6:
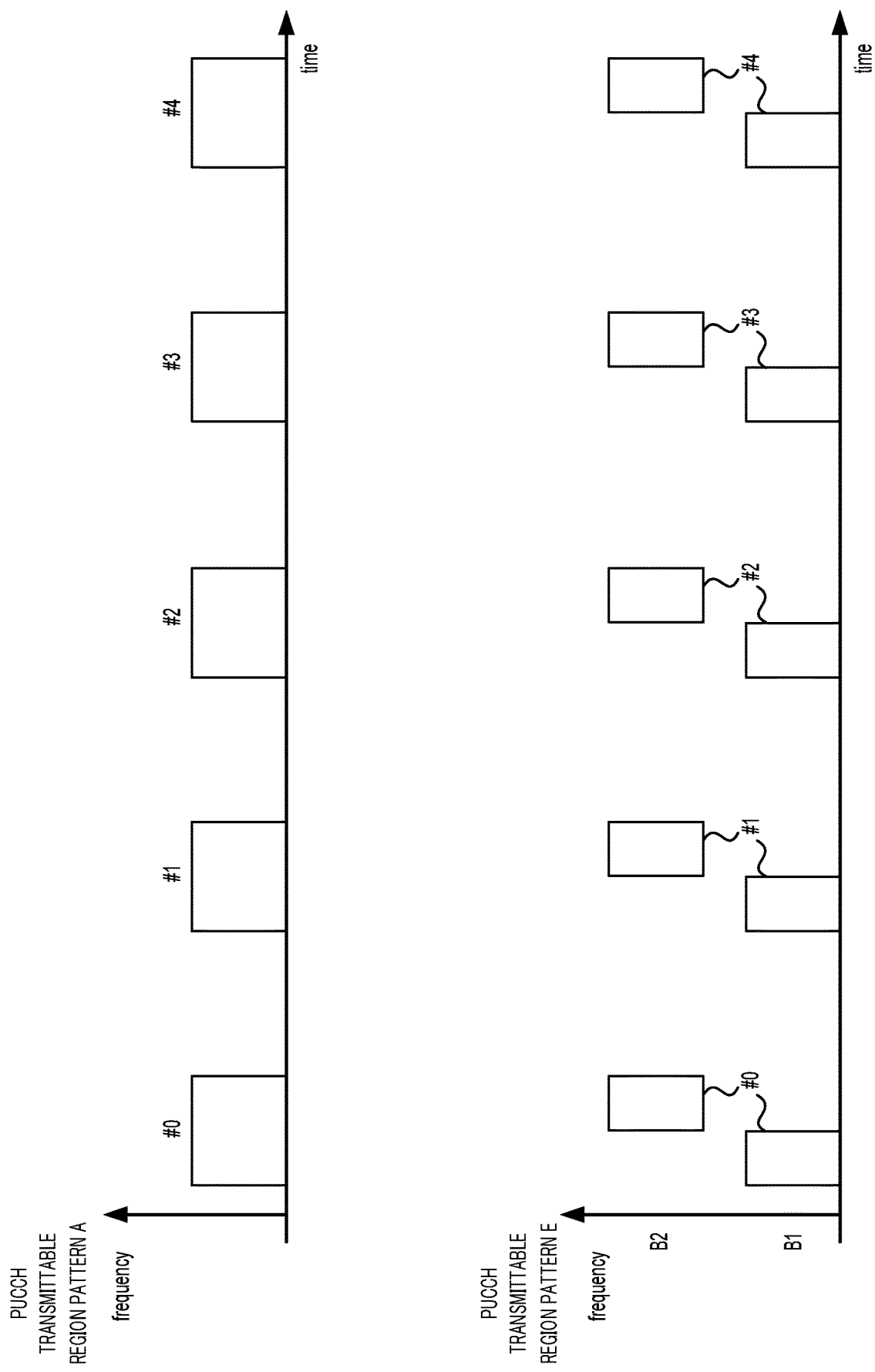
FIG. 6 is a diagram showing the second example of a transmittable region pattern according to the first configuration example of an embodiment of the present invention.

FIG. 6 is a diagram showing the second example of a transmittable region pattern according to the first configuration example of this embodiment. In FIG. 6, the horizontal axis indicates the time axis, and the vertical axis indicates the frequency axis. FIG. 6 shows transmittable region pattern A shown in FIG. 5 and transmittable region pattern E not shown in FIG. 5.

In transmittable region pattern E, one transmittable region (for example, region #1) is configured in two frequency bands B1 and B2. It should be noted that partial regions of the two frequency bands B1 and B2 configured as one transmittable region do not overlap along the time axis.

FIG. 6 shows an example in which one transmittable region is configured in two frequency bands B1 and B2. In the present invention, one transmittable region may be configured in three or more frequency bands.

Next, a description will be given of an example of a method of notification of a PUCCH transmission region from radio base station 10 to user terminal 20.

Figure 7:
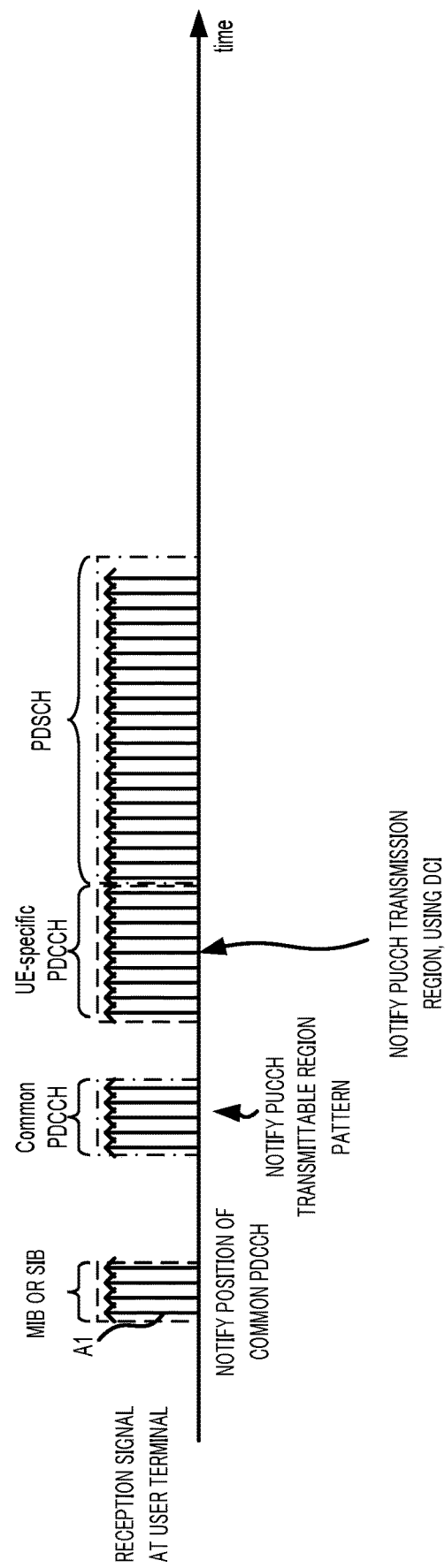
FIG. 7 is a diagram showing an example of a method of notification of a PUCCH transmission region according to the first configuration example of an embodiment of the present invention.

FIG. 7 is a diagram showing an example of a method of notification of a PUCCH transmission region according to the first configuration example of this embodiment. The horizontal axis of FIG. 7 indicates the time axis. FIG. 7 shows a reception signal that user terminal 20 receives.

First, user terminal 20 acquires information on the position of a PDCCH (common PDCCH) common to user terminals 20. The information is notified using an MIB or SIB.

Next, user terminal 20 receives the common PDCCH according to the acquired information on the position of the common PDCCH, and acquires information on the PUCCH transmittable region pattern which is notified through the common PDCCH. The information on a PUCCH transmittable region pattern is, for example, information on one of the identifiers respectively associated with the multiple transmittable region patterns shown in FIG. 5.

User terminal 20 then acquires the index information indicating the PUCCH transmission region notified through the PDCCH (UE-specific PDCCH) addressed to each user terminal 20.

Based on the information on the PUCCH transmittable region pattern, user terminal 20 specifies the transmittable region pattern applied by radio base station 10. User terminal 20 then specifies the PUCCH transmission region configured in user terminal 20 in the specified transmittable region pattern, based on the index information indicating the PUCCH transmission region.

<Effects of First Configuration Example>

In the first configuration example described above, radio base station 10 configures a PUCCH transmission region for user terminal 20 according to the transmittable region pattern recognized in radio base station 10 and user terminal 20. Radio base station 10 then notifies user terminal 20 of index information indicating the transmission region configured for user terminal 20. Based on the notified index information and transmittable region pattern, user terminal 20 specifies the PUCCH transmission region, and transmits a PUCCH including a response signal indicating the decoding result related to the DL data signal to radio base station 10. This method suppresses an increase in the amount of information (the number of bits of information) to be notified to user terminal 20 and enables flexible configuration of PUCCH transmission regions.

<Second Configuration Example>

The first configuration example described above describes an example in which the transmittable region pattern is common to multiple user terminals 20. The second configuration example describes an example in which the transmittable region pattern is configured for individual user terminals 20.

Figure 8:
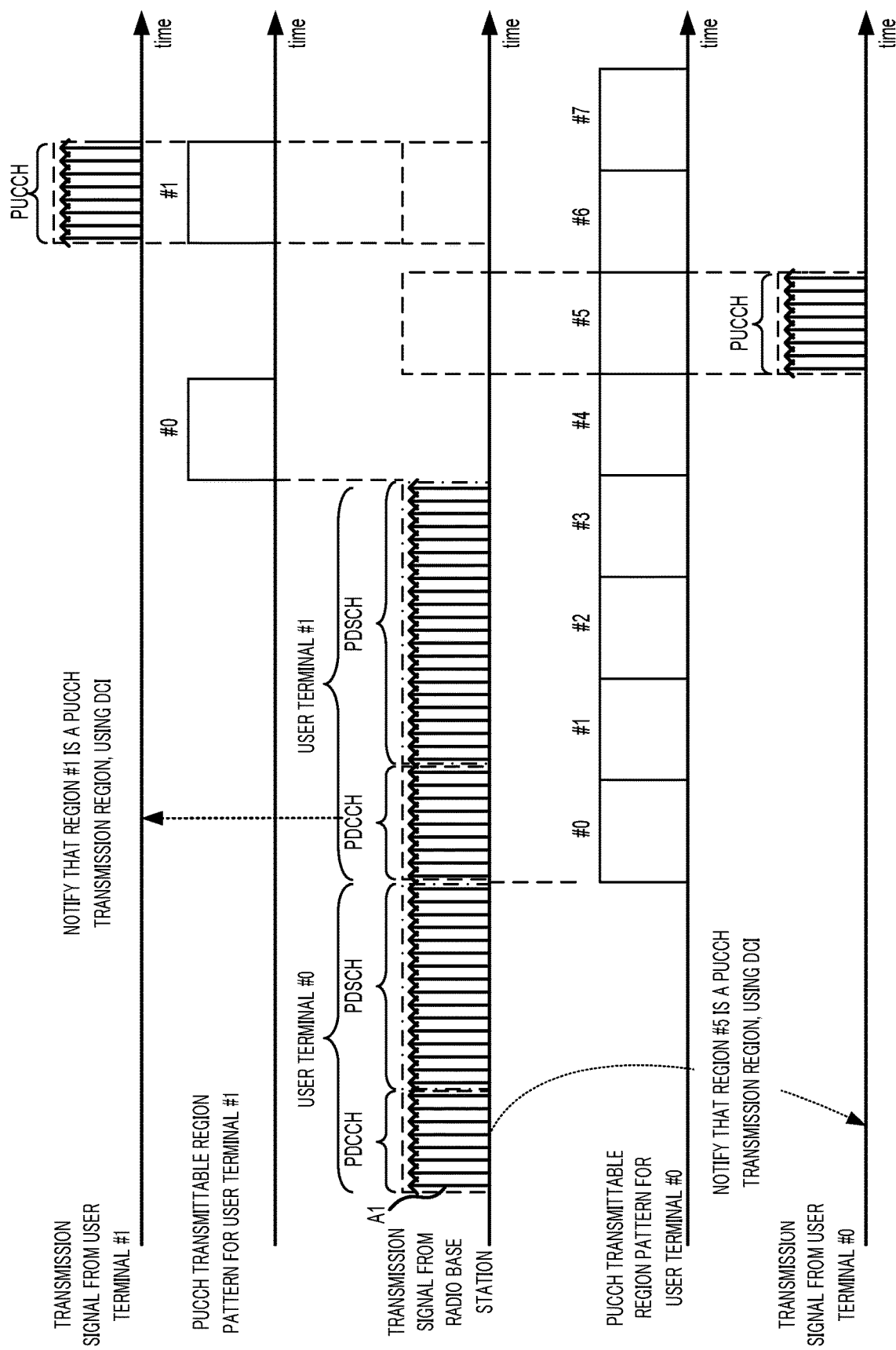
FIG. 8 is a diagram showing an example of a transmission signal from a radio base station and a transmission signal from a user terminal, according to the second configuration example of an embodiment of the present invention.

FIG. 8 is a diagram showing an example of a transmission signal from radio base station 10 and a transmission signal from user terminal 20, according to the second configuration example of this embodiment. The horizontal axis of FIG. 8 indicates the time axis. In FIG. 8, in order to distinguish two user terminals 20, they are represented by user terminal #0 and user terminal #1, respectively. As in FIG. 3, arrows A1 in the transmission signal shown in FIG. 8 indicate transmission points from which a DL signal and a UL signal are transmitted through a single carrier.

Further, FIG. 8 shows PUCCH transmittable region patterns for respective user terminals #0 and user terminal #1. The PUCCH transmittable region pattern for user terminal #0 corresponds to transmittable region pattern C shown in FIG. 5, and the PUCCH transmittable region pattern for user terminal #1 corresponds to transmittable region pattern A shown in FIG. 5. In FIG. 8, the transmittable regions in or after region #2 included in the PUCCH transmittable region pattern for user terminal #1 are omitted for convenience of illustration.

The transmittable region pattern for user terminal #0 is recognized in radio base station 10 and user terminal #0. The transmittable region pattern for user terminal #1 is recognized in radio base station 10 and user terminal #1.

The transmittable region pattern may be determined according to the specifications or may be notified through a higher layer signal and/or broadcast information (for example, master information block (MIB) and/or system information block (SIB)).

Further, FIG. 8 shows an example in which PUCCH transmittable region patterns for respective user terminals #0 and user terminal #1 are different. In this case, the transmittable region pattern may be notified through a PDCCH (UE-specific PDCCH) addressed to each user terminal 20.

Moreover, as in the first configuration example described above, the transmittable region pattern may be common to multiple user terminals 20. In this case, the transmittable region pattern may be notified through a common PDCCH for the user terminals 20.

In the second configuration example, the method of configurating the PUCCH transmission region is different from that in the first configuration example. To be specific, a PUCCH transmission region for each user terminal 20 starts from the timing of the end of transmission of the DL signal addressed to that user terminal 20 (the timing of the end of transmission of the PDSCH in the example shown in FIG. 8), and is configured based on the PUCCH transmittable region pattern for each user terminal 20.

For example, when scheduler 101 configures a PUCCH transmission region for user terminal #0, scheduler 101 performs scheduling for a DL signal addressed to user terminal #0 and specifies the timing of the end of transmission of DL signal addressed to user terminal #0. Scheduler 101 then configures the PUCCH transmittable region pattern for user terminal #0 stating from the specified transmission end timing. Scheduler 101 then specifies, among PUCCH transmittable region patterns for user terminal #0, transmittable regions included in regions in which no DL signals are transmitted and regions in which no other UL signals are received. Scheduler 101 then configures at least one of the specified transmittable regions as a PUCCH transmission region for user terminal #0.

In the example shown in FIG. 8, among the configured transmittable regions included in the PUCCH transmittable region pattern for user terminal #0 starting from the timing of the end of transmission of the PDSCH for user terminal #0, regions #4 to #7 are transmittable regions included in regions in which no DL signals are transmitted. Scheduler 101 configures region #5 as a PUCCH transmission region for user terminal #0.

Further, for example, when scheduler 101 configures a PUCCH transmission region for user terminal #1, scheduler 101 performs scheduling for a DL signal addressed to user terminal #1, and specifies the timing of the end of transmission of the DL signal addressed to user terminal #1. Scheduler 101 then configures a PUCCH transmittable region pattern for user terminal #1 starting from the specified transmission end timing. Scheduler 101 then specifies transmittable regions included in regions in which no DL signals are transmitted and regions in which no other UL signals are received, among PUCCH transmittable region patterns for user terminal #1. Scheduler 101 then configures at least one of the specified transmittable regions as a PUCCH transmission region for user terminal #1.

In the example shown in FIG. 8, among the configured transmittable regions included in the PUCCH transmittable region pattern for user terminal #1 starting from the timing of the end of transmission of the PDSCH for user terminal #1, regions #0 and #1 are transmittable regions included in regions in which no DL signals are transmitted. Scheduler 101 configures region #1 as a PUCCH transmission region for user terminal #1.

It should be noted that scheduler 101 may configure, for example, region #6 and/or region #7 included in the PUCCH transmittable region pattern for user terminal #0 as a PUCCH transmission region for user terminal #0. In this case, since region #1 included in the PUCCH transmittable region pattern for user terminal #1 and regions #6 and #7 included in the PUCCH transmittable region pattern for user terminal #0 overlap each other, scheduler 101 may configure region #0 included in the PUCCH transmittable region pattern for user terminal #1 as a PUCCH transmission region for user terminal #1.

As in the first configuration example, the index information indicating the PUCCH transmission region configured for each user terminal 20 is notified using the DCI included in the PDCCH addressed to each user terminal 20.

As in the first configuration example, mapper 208 of user terminal 20 configures the PUCCH transmission region according to the index information acquired from demodulator and decoder 205 and the recognized transmittable region pattern. At this time, mapper 208 obtains information on the timing of the end of reception of the DL signal from demodulator and decoder 205, configures a recognized transmittable region pattern starting from the reception end timing, and maps ACK/NACK in the PUCCH transmission region indicated by the index information.

It should be noted that, as in the first configuration example, the transmittable region pattern is not limited to that shown in FIG. 8 in the second configuration example. For example, one of the multiple transmittable region patterns shown in FIG. 5 and/or FIG. 6 may be configured for each user terminal 20.

In the second configuration example, transmittable region patterns are configured for individual user terminals 20. In this case, a method of associating a transmittable region pattern with other information defined for each user terminal 20 may be used.

Other information defined for each user terminal 20 includes, for example, at least one of uplink transmission signal information related to an uplink signal transmitted from user terminal 20, downlink transmission signal information related to a downlink signal received by user terminal 20, uplink quality information related to uplink quality, and downlink quality information related to downlink quality.

Uplink transmission signal information is, for example, at least one of the transport block size (TBS) and modulation and coding scheme (MCS) configured for an uplink signal. Downlink transmission signal information is, for example, at least one of the TBS and MCS configured for a downlink signal. Note that the term TBS is merely an example and a term indicating a transmission size and/or a reception size used in future communication methods may be used. For example, instead of TBS, a term corresponding to the size of code block (CB) which is a block obtained by subdividing transport block (TB) may be used. In addition, the term MCS is merely an example, and a term corresponding to MCS for a modulation and/or coding scheme intentionally used in future communication methods may be used.

Uplink quality information is, for example, at least one of uplink reference signal received power (RSRP) and reference signal received quality (RSRQ). Downlink quality information is, for example, at least one of downlink RSRP and RSRQ. Note that the terms RSRP and RSRQ are merely examples, and the terms corresponding to RSRP and RSRQ indicating the quality information related to each antenna port used in future communication methods (for example, channel state information (CSI)-RSRP and CSI-RSRQ) may be used.

Information on TBS and MCS is configured for each user terminal 20 in radio base station 10 and is notified to user terminal 20 and is therefore recognized in user terminal 20 and radio base station 10. In addition, information on RSRP and RSRQ is measured in user terminal 20 and fed back to radio base station 10 and is therefore recognized in user terminal 20 and radio base station 10.

For example, when the RSRP is less than or equal to the threshold, a transmittable region pattern (for example, pattern B in FIG. 5) with a relatively large transmittable region size may be associated. When the RSRP is greater than the threshold, a transmittable region pattern (for example, pattern A in FIG. 5) with a relatively small transmittable region size may be associated. When the RSRP is less than or equal to the threshold, a low coding rate and/or repetition may be used. With a low coding rate and/or repetition, a decrease in the PUCCH reception quality in radio base station 10 can be suppressed.

In addition, for example, when the amount of information (the number of bits of information) mapped to the PUCCH is greater than or equal to the threshold, a transmittable region pattern (for example, pattern B in FIG. 5) with a relatively large transmittable region size may be associated. When the amount of information (the number of bits of information) is less than the threshold, a transmittable region pattern (for example, pattern A in FIG. 5) with a relatively small transmittable region size may be associated.

In the case of using a method in which a transmittable region pattern is associated with other information defined for each user terminal 20, user terminal 20 specifies the transmittable region pattern according to other information defined for user terminal 20. With this method, radio base station 10 does not need to notify user terminal 20 of the transmittable region pattern, thereby suppressing an increase in the amount of information (the number of bits of information) notified to user terminal 20.

Note that the second configuration example has described an example in which a configured PUCCH transmission region for each user terminal 20 starts from the timing of the end of transmission of the DL signal addressed to that user terminal 20 (the timing of the end of transmission of the PDSCH in the example shown in FIG. 8). The start point is not limited to the timing of the end of transmission of the DL signal addressed to each user terminal 20, and may be, for example, the timing of the start of transmission of the DL signal addressed to each user terminal 20 (the timing of the start of transmission of the PDCCH in the example shown in FIG. 8). Further, the start point may be commonly configured for multiple user terminals 20.

<Effects of Second Configuration Example>

In the second configuration example described above, radio base station 10 configures a PUCCH transmission region for user terminal 20 according to the transmittable region pattern recognized in radio base station 10 and user terminal 20. Radio base station 10 then notifies user terminal 20 of index information indicating the transmission region configured for user terminal 20. Based on the notified index information and transmittable region pattern, user terminal 20 specifies the PUCCH transmission region, and transmits a PUCCH including a response signal indicating the decoding result related to the DL data signal to radio base station 10. This method suppresses an increase in the amount of information (the number of bits of information) to be notified to user terminal 20 and enables flexible configuration of PUCCH transmission regions.

Further, in the second configuration example, transmittable region patterns are configured for individual user terminals 20, thereby enabling more flexible configuration of PUCCH transmission regions for individual user terminals 20.

<Third Configuration Example>

The first and second configuration examples described above have described examples in which radio base station 10 notifies user terminal 20 of index information indicating the PUCCH transmission region. The third configuration example will describe an example in which user terminal 20 configures a PUCCH transmission region without receiving a notification from radio base station 10.

Figure 9:
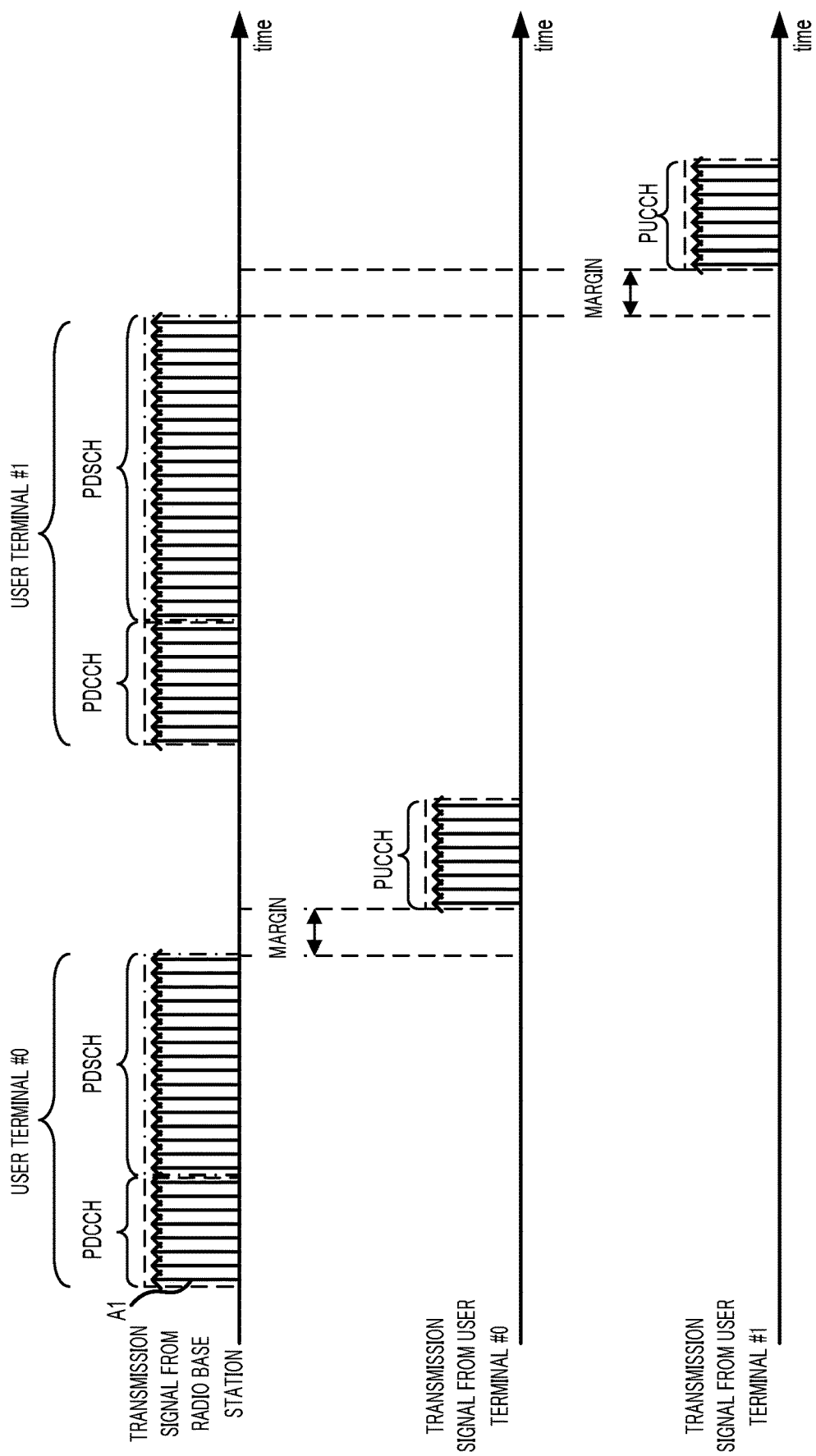
FIG. 9 is a diagram showing an example of a transmission signal from a radio base station and a transmission signal from a user terminal, according to the third configuration example of an embodiment of the present invention.

FIG. 9 is a diagram showing an example of a transmission signal from radio base station 10 and a transmission signal from user terminal 20, according to the third configuration example of this embodiment. The horizontal axis of FIG. 9 indicates the time axis. In FIG. 9, in order to distinguish two user terminals 20, they are represented by user terminal #0 and user terminal #1, respectively. As in FIG. 3, arrows A1 in the transmission signal shown in FIG. 9 indicate transmission points from which a DL signal and a UL signal are transmitted through a single carrier.

In the example shown in FIG. 9, a predetermined margin is provided which starts from the timing of the end of transmission of a DL signal addressed to user terminal #0 transmitted from radio base station 10. A PUCCH transmission region for user terminal #0 is configured in a certain time region coming after the predetermined margin along the time axis. Similarly, a predetermined margin is provided which starts from the timing of the end of transmission of a DL signal addressed to user terminal #1 transmitted from radio base station 10. A PUCCH transmission region for user terminal #1 is configured in a certain time region coming after the predetermined margin along the time axis.

Such a predetermined margin is determined considering, for example, the switching time between a DL link and an UL link, a difference between DL link and/or UL link arrival times (for example, a difference between the timing of the transmission of a DL signal from radio base station 10 and the timing of the reception of the DL signal at user terminal 20), and the processing times in radio base station 10 and user terminal 20.

Such a predetermined margin and information on a certain time region for a PUCCH are recognized in radio base station 10 and user terminal 20.

Scheduler 101 of radio base station 10 performs scheduling for a DL signal addressed to user terminal #0, and specifies the timing of the end of transmission of the DL signal addressed to user terminal #0. Scheduler 101 then configures a predetermined margin, which starts from a specified transmission end timing, and a certain time region as a section in which a PUCCH from user terminal #0 is received without transmission of other DL signals. Similarly, scheduler 101 performs scheduling for a DL signal addressed to user terminal #1, and specifies the timing of the end of transmission of the DL signal addressed to user terminal #1. Scheduler 101 then configures a predetermined margin, which starts from a specified transmission end timing, and a certain time region as a section in which a PUCCH from user terminal #1 is received without transmission of other DL signals.

Mapper 208 of user terminal 20 acquires information on the timing of the end of reception of the DL signal, from demodulator and decoder 205. Mapper 208 then provides a predetermined margin starting from the timing of the end of reception, configures a certain time region coming after the predetermined margin along the time axis as a PUCCH transmission region, and maps ACK/NACK.

In the third configuration example, information on a predetermined margin and/or a certain time region for a PUCCH may be common to multiple user terminals 20, or may be configured for individual user terminals 20.

In addition, information on a predetermined margin and/or a certain time region for a PUCCH may be associated with other information defined for each user terminal 20 (for example, at least one of TBS, MCS, RSRP, and RSRQ).

<Effects of Third Configuration Example>

In the third configuration example described above, a PUCCH transmission region for user terminal 20 is configured according to information on a predetermined margin and a certain time region for a PUCCH recognized in radio base station 10 and user terminal 20. Based on recognized information on a predetermined margin and a certain time region for a PUCCH, user terminal 20 configures the PUCCH transmission region, and transmits a PUCCH including a response signal indicating the decoding result related to the DL data signal to radio base station 10. With this method, the PUCCH transmission region is implicitly configured in a common region at radio base station 10 and user terminal 20 without notification of information indicating the PUCCH transmission region to user terminal 20, thereby suppressing an increase in the amount of information (the number of bits of information) notified to user terminal 20.

Embodiments of the present invention have been described so far.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wirelessly) connected, and the plurality of apparatuses may implement the functional blocks.

Figure 10:
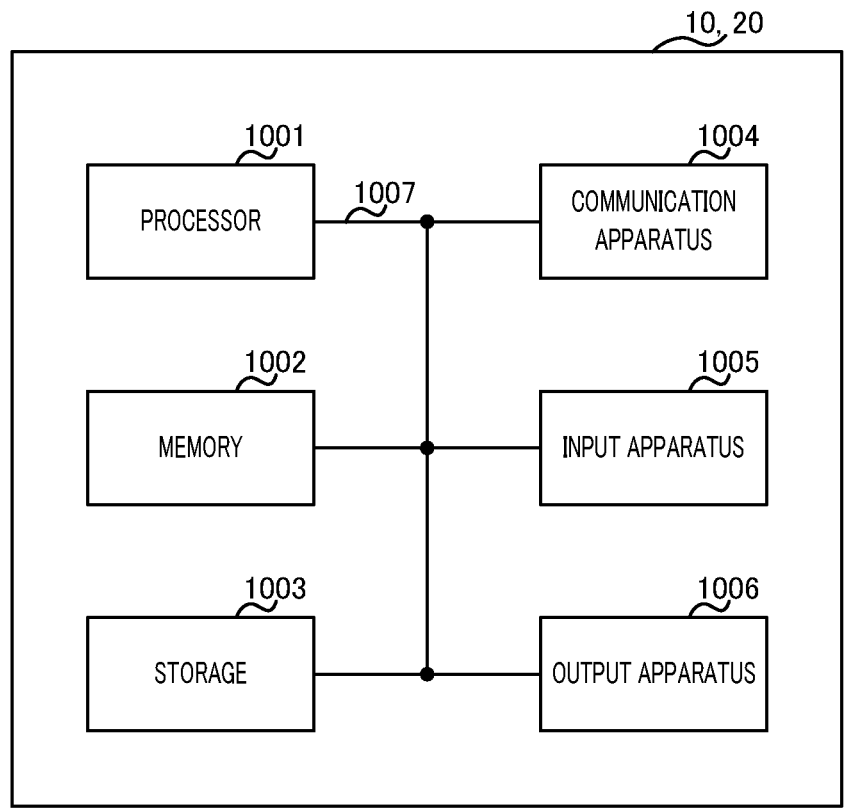
FIG. 10 is a diagram showing an example of the hardware configuration of a radio base station and a user terminal according to an embodiment of the present invention.

For example, the radio base station, the user terminal, and/or the like, according to an embodiment of the present invention may function as computers which perform processing of the radio communication method of the present invention. FIG. 10 illustrates an example of hardware configurations of the radio base station and the user terminal according to an embodiment of the present invention. The above-described radio base station 10 and user terminal 20 may be physically configured as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, the above-described scheduler 101, transmission signal generators 102 and 206, encoder and modulators 103 and 207, mappers 104 and 208, controllers 108 and 203, channel estimators 109 and 204, demodulator and decoders 110 and 205, and/or the like may be implemented using processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitters 105 and 209, antennas 106 and 201, receivers 107 and 202, and/or the like, as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and/or the Like)

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and/or the like can be output from a higher layer (or a lower layer) to a lower layer (or a higher layer). The information, the signals, and/or the like may be input and output through a plurality of network nodes.

(Handling of Input and Output Information and/or the Like)

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

("System" and "Network")

The terms "system" and "network" used in the present specification can be interchangeably used.

(Names of Parameters and Channels)

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, and/or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, and/or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe may be called a TTI, multiple continuous subframes may be called a TTI, one slot may be called a TTI, or one mini slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the number of mini-slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and/or the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio base station
20 User terminal
101 Scheduler
102, 206 Transmission signal generator
103, 207 Encoder and modulator
104, 208 Mapper
105, 209 Transmitter
106, 201 Antenna
107, 202 Receiver
108, 203 Controller
109, 204 Channel estimator
110, 205 Demodulator and decoder

The invention claimed is:

1. A terminal, comprising:
a receiver that receives a signal of a downlink shared channel; and
a transmitter that transmits Acknowledgement (ACK)/Negative Acknowledgement (NACK) information for the signal of the downlink shared channel using an uplink control channel in a time resource included in a plurality of time resource candidates,
wherein:
 the receiver receives a higher layer signal including information indicating the plurality of time resource candidates,
 the receiver receives downlink control information,
 the downlink control information provides a value, which is mapped to one of the plurality of time resource candidates, indicating the time resource for transmission of the ACK/NACK information, the time resource being among the plurality of time resource candidates, and
 the higher layer signal includes information on a symbol of the time resource, the time resource being indicated by the downlink control information, the symbol being for transmission of the ACK/NACK information.

2. A radio communication method, comprising:
receiving a signal of a downlink shared channel; and
transmitting Acknowledgement (ACK)/Negative Acknowledgement (NACK) information for the signal of the downlink shared channel using an uplink control channel in a time resource included in a plurality of time resource candidates,
wherein the method further includes:
    receiving a higher layer signal including information indicating the plurality of time resource candidates,
    receiving downlink control information, wherein
    the downlink control information provides a value, which is mapped to one of the plurality of time resource candidates, indicating the time resource for transmission of the ACK/NACK information, the time resource being among the plurality of time resource candidates, and
    the higher layer signal includes information on a symbol of the time resource, the time resource being indicated by the downlink control information, the symbol being for transmission of the ACK/NACK information.

3. A base station, comprising:
a transmitter that transmits a signal of a downlink shared channel; and
a receiver that receives Acknowledgement (ACK)/Negative Acknowledgement (NACK) information for the signal of the downlink shared channel using an uplink control channel in a time resource included in a plurality of time resource candidates,
wherein:
    the transmitter transmits a higher layer signal including information indicating the plurality of time resource candidates,
    the transmitter transmits downlink control information,
    the downlink control information provides a value, which is mapped to one of the plurality of time resource candidates, indicating the time resource for transmission of the ACK/NACK information, the time resource being among the plurality of time resource candidates, and
    the higher layer signal includes information on a symbol of the time resource, the time resource being indicated by the downlink control information, the symbol being for transmission of the ACK/NACK information.

4. The terminal according to claim 1, wherein the transmitter transmits the ACK/NACK information from the symbol indicated by the information included in the higher layer signal in the time resource indicated by the downlink control information among the plurality of time resource candidates.

\* \* \* \* \*